(12) United States Patent
Yamashita et al.

(10) Patent No.: US 11,563,204 B2
(45) Date of Patent: Jan. 24, 2023

(54) ELECTRODE, NON-AQUEOUS ELECTROLYTE BATTERY, BATTERY PACK, AND VEHICLE

(71) Applicant: Kabushiki Kaisha Toshiba, Minato-ku (JP)

(72) Inventors: Yasunobu Yamashita, Meguro (JP); Shinsuke Matsuno, Minato (JP); Norio Takami, Yokohama (JP); Hiroki Inagaki, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 265 days.

(21) Appl. No.: 16/668,417

(22) Filed: Oct. 30, 2019

(65) Prior Publication Data
US 2020/0303721 A1    Sep. 24, 2020

(30) Foreign Application Priority Data

Mar. 18, 2019   (JP) .............................. JP2019-050175

(51) Int. Cl.
*H01M 4/131*   (2010.01)
*H01M 4/1391*  (2010.01)
*H01M 10/0569* (2010.01)
*H01M 4/485*   (2010.01)
*H01M 4/04*    (2006.01)

(52) U.S. Cl.
CPC ......... *H01M 4/131* (2013.01); *H01M 4/0404* (2013.01); *H01M 4/1391* (2013.01); *H01M 4/485* (2013.01); *H01M 10/0569* (2013.01)

(58) Field of Classification Search
CPC ............... H01M 4/131; H01M 4/0404; H01M 4/1391; H01M 4/485; H01M 4/364; H01M 4/525; H01M 4/505; H01M 4/366; H01M 10/0569; H01M 10/0525; H01M 10/052; H01M 2004/028; Y02E 60/10; Y02P 70/50
See application file for complete search history.

(56) References Cited

U.S. PATENT DOCUMENTS

| | | | |
|---|---|---|---|
| 9,911,518 B2 * | 3/2018 | Kameyama | ............ C01G 53/42 |
| 2006/0046155 A1 | 3/2006 | Inagaki et al. | |
| 2006/0257745 A1 * | 11/2006 | Choi | ..................... H01M 4/505 |
| | | | 429/231.3 |

(Continued)

FOREIGN PATENT DOCUMENTS

| | | |
|---|---|---|
| EP | 3 413 391 A1 | 12/2018 |
| JP | 2006-228733 A | 8/2006 |

(Continued)

*Primary Examiner* — Matthew T Martin
*Assistant Examiner* — Katharine A Caughron
(74) *Attorney, Agent, or Firm* — Oblon, McClelland, Maier & Neustadt, L.L.P.

(57) ABSTRACT

According to one embodiment, an electrode includes a current collector and an active material layer. The active material layer is disposed on at least one of faces of the current collector. The active material layer comprises active materials which include at least a cobalt-containing oxide and a lithium nickel manganese oxide. A ratio of a weight of the cobalt-containing oxide to a total of weights of the cobalt-containing oxide and the lithium nickel manganese oxide is 5 wt % or more and 40 wt % or less.

14 Claims, 7 Drawing Sheets

(56) References Cited

U.S. PATENT DOCUMENTS

| | | | |
|---|---|---|---|
| 2010/0019208 A1* | 1/2010 | Choi | H01M 4/525 |
| | | | 252/506 |
| 2010/0255382 A1 | 10/2010 | Kim et al. | |
| 2012/0321933 A1 | 12/2012 | Kim et al. | |
| 2014/0363708 A1* | 12/2014 | Ito | H01M 50/3425 |
| | | | 429/56 |
| 2016/0172674 A1* | 6/2016 | Oda | H01M 4/525 |
| | | | 429/223 |
| 2016/0218358 A1* | 7/2016 | Sakai | H01M 4/366 |
| 2017/0018807 A1* | 1/2017 | Kishi | H01M 10/0568 |
| 2017/0271682 A1 | 9/2017 | Matsuno et al. | |
| 2017/0271717 A1 | 9/2017 | Yamashita et al. | |
| 2018/0034107 A1 | 2/2018 | Wolter et al. | |

FOREIGN PATENT DOCUMENTS

| | | |
|---|---|---|
| JP | 2008-293661 A | 12/2008 |
| JP | 2009-76468 A | 4/2009 |
| JP | WO 2012/023501 A1 | 2/2012 |
| JP | 2013-152825 A | 8/2013 |
| JP | 2013-152937 A | 8/2013 |
| JP | 2015-26454 A | 2/2015 |
| JP | 2016-136464 A | 7/2016 |
| JP | 2016-177981 A | 10/2016 |
| JP | 2017-521822 A | 8/2017 |
| JP | 2017-174809 A | 9/2017 |
| JP | 2017-174810 A | 9/2017 |
| JP | 2018-92955 A | 6/2018 |
| WO | WO 2015/136688 A1 | 9/2015 |
| WO | WO 2017/135323 A1 | 8/2017 |

\* cited by examiner

ELECTRODE, NON-AQUEOUS ELECTROLYTE BATTERY, BATTERY PACK, AND VEHICLE

CROSS-REFERENCE TO RELATED APPLICATIONS

This application is based upon and claims the benefit of priority from Japanese Patent Applications No. 2019-050175, filed on Mar. 18, 2019; the entire contents of which are incorporated herein by reference.

FIELD

Embodiments described herein relate generally to an electrode, a non-aqueous electrolyte battery, a battery pack, and a vehicle.

BACKGROUND

Non-aqueous electrolyte batteries including a lithium metal, a lithium alloy, a lithium compound, or a carbonaceous material as a negative electrode show promise as high energy density batteries, and are actively researched and developed. The following lithium ion batteries have been widely used so far: those that include a positive electrode containing $LiCoO_2$, $LiMn_2O_4$, $LiNi_{1/3}Co_{1/3}Mn_{1/3}O_2$ or $LiFePO_4$ as an active material, and a negative electrode containing a carbonaceous material that absorbs and desorbs lithium. Furthermore, with regard to the negative electrode, metal oxides or alloys have been studied as substitutes of the carbonaceous material.

High-energy and high-output large batteries for stationary machine and automobiles are required to have excellence in cycle performance, thermal stability, and discharge rate performance under high-temperature environments, and it is required to achieve a cell to which all these performances are imparted. Lithium nickel manganese oxide (LNMO) positive electrodes such as a $LiNi_{0.5}Mn_{1.5}O_4$-containing positive electrode have a problem that those electrodes generate gas due to charge and discharge. To prevent gas generation, for example, solids or gel electrolytes have been proposed. However, there is a problem that these electrolytes have a lower Li conductivity than liquids and causes deterioration in input/output characteristics.

DETAILED DESCRIPTION

Figure 1:
FIG. 1 is a conceptual cross-sectional view of an electrode according to a first embodiment.

According to one embodiment, an electrode includes a current collector and an active material layer. The active material layer is disposed on at least one of faces of the current collector. The active material layer comprises active materials which include at least a cobalt-containing oxide and a lithium nickel manganese oxide. A ratio of a weight of the cobalt-containing oxide to a total of weights of the cobalt-containing oxide and the lithium nickel manganese oxide is 5 wt % or more and 40 wt % or less.

Embodiments will now be described with reference to the drawings. Note that structures common in all the embodiments are denoted with the same symbols and will not be described repeatedly. Furthermore, each drawing is a schematic view for describing each embodiment and for a better understanding thereof. Some parts in the drawings are different from those in the actual device, for example, in shape, size, and ratio, but it should be noted that shapes, sizes, and ratios may be changed as appropriate with reference to the following description and known techniques.

First Embodiment

An electrode according to a first embodiment includes a current collector and an active material layer disposed on at least one of faces (surfaces) of the current collector. The active material layer contains at least a cobalt-containing oxide and a lithium nickel manganese oxide as active materials. A ratio of a weight (ratio by weight) of the cobalt-containing oxide to a total of weights of the cobalt-containing oxide and the lithium nickel manganese oxide is 5 wt % or more and 40 wt % or less.

FIG. 1 is a conceptual cross-sectional view of an electrode according to a first embodiment. An electrode 100 according to the present embodiment includes a current collector 101 and an active material layer 102. The active material layer 102 contains an active material, a conductive agent, and a binding agent. The active material layer 102 is disposed on one side or both sides of the current collector 101. Hereinafter described is a case where the electrode according to the present embodiment is used as a positive electrode.

Positive Electrode

A positive electrode includes a positive electrode current collector and a positive electrode active material layer. The positive electrode active material layer contains a positive electrode active material, a conductive agent, and a binding agent. The positive electrode active material layer is disposed on one side or both sides of the positive electrode current collector.

The positive electrode active material contains a lithium nickel manganese oxide (for example, $Li_uM1_xMn_{2-x}O_4$, $0<u\leq1$, $0<x<0.7$, and M1 includes at least one of Mn, Ni, Fe, Cr, Mg, Zn, Al, and Cu) and a cobalt-containing oxide. The cobalt-containing oxide includes, for example, at least one selected from the group consisting of $Li_uM2_xCo_{1-x}PO_4$, $Li_{2-u}M2_xCo_{1-x}PO_4F$, $Li_uM2_xCo_{1-x}O_2$, $Li_uM2_xCo_{1-x}BO_3$, and $Li_uM2_xCo_{1-x}SiO_4$ (0<u≤1, 0≤x≤0.8, and M2 includes at least Mn, Ni, Fe, Mg, Zn, Al, and Cu). The cobalt-containing oxide to be mixed with the lithium nickel manganese oxide may be used independently or combined with a plurality of compounds. The lithium nickel manganese oxide has, for example, a spinel structure.

The cobalt-containing oxide may be a composition not containing a substitution element M2. However, from a viewpoint of crystal structure stability, it is preferable that the cobalt-containing oxide be a composition containing M2, and it is more preferable that M2 be Fe or Mg. Such substitution elements prevent a collapse of the crystal structure which is caused by destabilized $Mn^{3+}$ due to the Jahn-Teller effect along with charge and discharge.

A ratio of a weight (ratio by weight) of the cobalt-containing oxide to a total of weights of the cobalt-containing oxide and the lithium nickel manganese oxide is preferably 5 wt % or more and 40 wt % or less. For example, provided that a total of weights of the cobalt-containing oxide and the lithium nickel manganese oxide is A, and a weight of the cobalt-containing oxide is B, 5 wt % 5≤B/A≤40 wt % is satisfied. A ratio by weight within this range makes it possible to maintain a high operating voltage and input/output characteristics of the lithium nickel manganese oxide while sufficiently maintaining an effect of preventing gas generation. A ratio by weight below 5 wt % cannot achieve the sufficient effect of preventing gas generation, and a ratio by weight over 40 wt % decreases an amount of lithium nickel manganese oxide contained in the electrode, and both cases make it difficult to maintain a high operating voltage and input/output characteristics.

More preferably, a ratio by weight of the cobalt-containing oxide to the total of weights of the active material is 10 wt % or more and 20 wt % or less. A ratio by weight within this range makes it possible to maintain a high operating voltage and input/output characteristics of the lithium nickel manganese oxide while maintaining an effect of preventing gas generation more sufficiently.

A ratio by weight of the cobalt-containing oxide to a total of weights of the cobalt-containing oxide and the lithium nickel manganese oxide is measured in the following manner. First, after completely discharging a cell, the cell is disassembled under an inert atmosphere, and a positive electrode is cut out. The cut-out electrode is first impregnated in a mixed solvent of propylene carbonate as a cyclic solvent and diethyl ether as a chain solvent, for 10 minutes at a volume ratio of 1:1 to dissolve lithium salts remaining in an electrode active material layer. Furthermore, the electrode is impregnated in a single solvent of diethyl ether for 10 minutes to remove the solvent from the electrode active material layer. The washed electrode is punched out to have a size of, for example, 14 mm in diameter and the punch-out electrode is placed on a measurement holder. It is preferable to perform measurement by X-ray diffraction (XRD) on the electrode while an inert atmosphere is maintained. XRD measurement may be performed, for example, with an XRD measurement device such as a desk-top X-ray diffractometer D2 PHASER available from BRUKER under the following measurement conditions. A diffraction angle 2θ relative to a Cu—Kα radiation source is from 10 degrees to 80 degrees, a step width is 0.02 degrees, and the integration time is 2.0 seconds. A diffraction peak obtained is analyzed by the Rietveld method to identify a ratio by weight of the cobalt-containing oxide to a total of weights of the cobalt-containing oxide and the lithium nickel manganese oxide.

The Rietveld analysis is performed, for example, with TOPAS (available from BRUKER) in the following manner. First, a crystal structure of an active material included in an electrode is presented to define a background function, whereby performing fitting. Since a sample is completely discharged, the initial value of occupancy of Li site is 1, but it should be noted that the fitting is performed without fixing the occupancy. With regard to a compound system that forms solid solutions having different composition ratios of transition metals but the same crystal structure, a plurality of corresponding transition metals are provided to the same site, and fitting is performed using the occupancy as a parameter. When an S value (Goodness-of-fit) converges to 1.3 or less, the fitting is regarded as complete, and a ratio by weight is determined from a composition ratio of an active material determined from analysis results.

Furthermore, with regard to a particle size of the positive electrode active material, when an average particle size of the lithium nickel manganese oxide is d50(Ni—Mn) and an average particle size of cobalt-containing oxide is d50(Co), it is preferable that a particle size ratio satisfy 10≤d50(Ni—Mn)/d50(co)≤200. A particle size ratio within this range makes it possible to fill the cobalt-containing oxide in a void between lithium nickel manganese oxide particles which have a large average particle size. Accordingly, it is possible to improve electrode density, leading to higher energy density of the cell. The lithium nickel manganese oxide preferable has an average particle size of 1 μm or more and 20 μm or less. An average particle size below 1 μm causes an increase in specific surface of the lithium nickel manganese oxide and an increase in amount of gas generated by a side reaction with an electrolyte. On the other hand, an average particle size over 20 μm causes an increase of a Li diffusion distance inside the lithium nickel manganese oxide and an increase of Li concentration polarization inside a particle, leading to deterioration of input/output characteristics. It is more preferable that a particle size ratio be 15≤d50(Ni—Mn)/d50 Co)≤100. The reason is that such a structure enables a high-density electrode with input/output characteristics maintained and prevents gas generation sufficiently.

Furthermore, it is more preferable that the lithium nickel manganese oxide have an average particle size of 5 μm or more and 12 μm or less. The reason is that the lithium nickel manganese oxide having an average particle size in such a range enables a higher-density electrode while maintaining input/output characteristics.

The cobalt-containing oxide preferably has an average particle size of 10 nm or more and 2 μm or less. The cobalt-containing oxide having an average particle size in such a range assures a surface area of an active material appropriate for treating a gas generated from the lithium nickel manganese oxide. The cobalt-containing oxide having an average particle size below 10 nm accelerates deterioration of the cobalt-containing oxide, which markedly decreases cell performances. The cobalt-containing oxide having an average particle size over 2 μm leads to an insufficient ratio of average particle size between the cobalt-containing oxide and the lithium nickel manganese oxide, which makes it difficult to sufficiently increase a density of an electrode.

More preferably, the cobalt-containing oxide has an average particle size of 50 nm or more and 500 nm or less. The cobalt-containing oxide having an average particle size within this range sufficiently prevents gas generation and prevents deterioration due to an excessively large surface of the cobalt-containing oxide.

A method for measuring an average particle size of an active material will now be described.

The measurement of an average particle size of an active material is performed on a washed electrode as described above. An average particle size is determined, for example, by laser diffraction.

The method for measuring an average particle size is as follows. This method employs a laser diffraction distribution measurement device (for example, MT3300EXII by Nikkiso Microtrack). First, about 0.1 g of a sample, a surfactant, and 1 to 2 mL of distilled water are added to a beaker and stirred sufficiently. The mixture is poured into a stirring water bath to prepare a sample solution. Using this sample solution, light intensity distribution is measured 64 times at 2-second intervals to analyze particle size distribution data.

The cobalt-containing oxide preferably has a crystallite diameter of 1 nm or more and 100 nm or less. The reason is that the cobalt-containing oxide having a crystallite diameter in such a range assures stability of a crystal structure and Li diffusivity. With a crystallite diameter below 1 nm, the structure becomes amorphous and cycle characteristics tend to deteriorate. With a crystallite diameter over 100 nm, a Li-diffusion distance becomes large, and input/output characteristics tend to deteriorate. Therefore, crystallite diameter below 1 nm and crystallite diameter over 100 nm are not preferable. It is more preferable that the cobalt-containing oxide have a crystallite diameter of 10 nm or more and 50 nm or less. The reason is that the cobalt-containing oxide having a crystallite diameter in such a range is more preferable in assuring stability of a crystal structure and Li diffusivity. A crystallite diameter is calculated based on the Scherrer equation calculated from a main peak observed by XRD measurement of a powder of the cobalt-containing oxide or the electrode. For example, first, the obtained XRD pattern is collated with a database to identify an electrode active material. It is possible to calculate a crystallite diameter based on the Scherrer equation calculated from a main peak of an electrode active material of interest.

In addition to the cobalt-containing oxide and the lithium nickel manganese oxide, the positive electrode may contain other positive electrode active materials. For example, oxides and polymers are used. The positive electrode active material may contain one of these oxides and polymers, or may contain two or more.

Other oxides are, for example, lithium-occluded manganese dioxide ($MnO_2$), iron oxide, copper oxide, nickel oxide, and lithium manganese composite oxides (for example, $Li_xMn_2O_4$ and $Li_xMnO_2$), lithium nickel composite oxides (for example, $Li_xNiO_2$), lithium phosphorus oxides having an olivine structure (for example, $Li_xFePO_4$ and $Li_xFe_{1-y}Mn_yPO_4$), iron sulfate ($Fe_2(SO_4)_3$), or vanadium oxides (for example, $V_2O_5$). It is preferable that x and y satisfy $0<x\leq 1$ and $0\leq y\leq 1$.

As the polymers, conductive polymer materials such as polyaniline or polypyrrole or disulfide polymer materials are employable. Sulfur (S) and carbon fluoride are also employable as the active material.

The conductive agent that is included in the positive electrode has an effect of enhancing a current collection performance and preventing contact resistance between the active material and the current collector. Examples of the conductive agent include carbonaceous materials such as acetylene black, carbon black, graphite, carbon nanofibers, and carbon nanotubes. With regard to the carbonaceous materials, one carbonaceous material may be used independently, or a plurality of carbonaceous materials may be used.

The binding agent has an effect of binding the active material, the conductive agent, and the current collector. Examples of the binding agent include polytetrafluoroethylene (PTFE), polyvinylidene fluoride (PVdF), fluorine rubber, styrene butadiene rubber, acrylic resin, or copolymers thereof, and polyacrylic acid and polyacrylonitrile.

It is preferable that the entire positive electrode active material, the conductive agent, and the binding agent be compounded in the positive electrode active material-containing layer are at the following rates. They are 80% by mass or more and 95% by mass or less, 3% by mass or more and 18% by mass or less, and 2% by mass or more and 17% by mass or less, respectively. With the conductive agent at a rate of 3% by mass or more, it is possible to exhibit the aforementioned effects. With the conductive agent at a rate of 18% by mass or less, it is possible to reduce decomposition of a non-aqueous electrolyte on a surface of the conductive agent being stored under high temperatures. With the binding agent at a rate of 2% by mass or more, it is possible to obtain a sufficient electrode strength. With the binding agent at a rate of 17% by mass or less, it is possible to reduce an amount of the binding agent compounded in the positive electrode as an insulating material, which reduces internal resistance.

The positive electrode is prepared, for example, by the following method. First, a positive electrode active material, a conductive agent, and a binding agent are suspended in a solvent to prepare slurry. The slurry is applied to one surface or both surfaces of a positive electrode current collector, and the resulting coating film is dried. Next, the dried coating film is pressed to yield a positive electrode active material-containing layer. Alternatively, the positive electrode active material, the conductive agent, and the binding agent may be formed into pellets, and these pellets may be disposed on the positive electrode current collector and used as a positive electrode active material layer.

An electrode according to the first embodiment includes a current collector and an active material layer disposed on at least one of faces (surfaces) of the current collector. The active material layer contains at least a cobalt-containing oxide and a lithium nickel manganese oxide as active materials. A ratio by weight of the cobalt-containing oxide to a total of weights of the cobalt-containing oxide and the lithium nickel manganese oxide is 5 wt % or more and 40 wt % or less. A cell provided with such an electrode prevents an electrolyte decomposition reaction and prevents gas generation while maintaining input/output characteristics of the cell, which makes it possible to provide a cell having excellent stability in cycle characteristics.

Second Embodiment

A non-aqueous electrolyte battery according to a second embodiment includes the electrode according to the first embodiment as a positive electrode, and further includes a negative electrode containing a titanium-containing oxide, and a non-aqueous electrolyte. Hereinafter described in detail are a positive electrode, a negative electrode, a non-aqueous electrolyte, a separator, an exterior member, a positive electrode terminal, and a negative electrode terminal included in the non-aqueous electrolyte battery according to the present embodiment.

Positive Electrode

The electrode according to the first embodiment is used as a positive electrode.

Negative Electrode

The negative electrode includes a negative electrode current collector and a negative electrode active material layer. The negative electrode active material layer contains a negative electrode active material, a conductive agent, and a binding agent. The negative electrode active material layer is formed on one side or both sides of the negative electrode current collector.

The negative electrode active material is contained in the negative electrode in the form of, for example, a particle. A particle of the negative electrode active material may be a single primary particle, a secondary particle which is an aggregate of primary particles, or a mixture of a single primary particle and a secondary particle. From a viewpoint of increasing density, the negative electrode active material layer preferably includes 5 to 50% by volume of primary particles. The shape of the primary particles is not particularly limited and may be, for example, spherical, elliptical, flat, or fibrous.

The negative electrode active material includes a titanium-containing oxide. Examples of the titanium-containing oxide are as follows.

A lithium titanate having a spinel structure and represented by the general expression $Li_{4+x}Ti_5O_{12}$ (where x is $-1 \leq x \leq 3$)

A monoclinic β-type titanium composite oxide represented by the general expression $Li_xTiO_2$ (where $0 \leq x$) (pre-charge structure is $TiO_2$ (B))

A niobium titanium oxide having a rutile structure, and represented by $Li_aTiM_bN_{b2\pm\beta}O_{7\pm\sigma}$ (where $0 \leq a \leq 5$, $0 \leq b \leq 0.3$, $0 \leq \beta \leq 0.3$, $0 \leq \sigma \leq 0.3$, and M is at least one element selected from the group consisting of Fe, V, Mo, and Ta) or $Ti_{1-x}M1_xNb_{2-y}M2_yO_{7-\delta}$ (where $0 \leq x < 1$, $0 \leq y < 1$, M1 and M2 contain at least one of Mg, Fe, Ni, Co, W, Ta, and Mo, and the element M1 and the element M2 may be the same or different)

An anatase titanium composite oxide (pre-charge structure is $TiO_2$) and ramsdellite lithium titanate represented by $Li_{2+x}Ti_3O_7$, $Li_{1+x}Ti_2O_4$, $Li_{1.1+x}Ti_{1.8}O_4$, $Li_{1.07+x}Ti_{1.86}O_4$, $Li_xTiO_2$ (x is $0 \leq x$)

An orthorhombic Na-containing niobium titanium composite oxide represented by $Li_{2+v}Na_{2-w}M1_xTi_{6-y-z}Nb_yM2_zO_{14+\delta}$ (where M1 includes at least one of Cs, K, Sr, Ba, and Ca, M2 includes at least one of Zr, Sn, V, Ta, Mo, W, Fe, Co, Mn, and Al, $0 \leq v \leq 4$, $0 < w < 2$, $0 \leq x < 2$, $0 < y \leq 6$, $0 \leq z < 3$, and $-0.5 \leq \delta \leq 0.5$).

Among these examples, lithium titanate having a spinel structure is preferable because it is excellent in cycle characteristics and rate characteristics. Furthermore, the negative electrode active material may include a niobium composite oxide. Examples of the niobium composite oxide include $Nb_2O_5$ and $Nb_{12}O_{29}$.

It is preferable that a particle of the negative electrode active material have an average particle size of 1 μm or less. With regard to a specific surface area determined by BET based on $N_2$ adsorption, it is preferable that the particle of the negative electrode active material have a specific surface area of 3 $m^2/g$ or more and 200 $m^2/g$ or less. Such a structure enables the negative electrode to have high affinity with the electrolyte.

The reason for defining a specific surface area of the negative electrode in the above range will now be described. A negative electrode having a specific surface area below 3 $m^2/g$ causes conspicuous particle aggregation, which decreases affinity between the negative electrode and an electrolyte, and increases interfacial resistance of the negative electrode. Accordingly, output characteristics and charge/discharge cycle characteristics decrease. On the other hand, a negative electrode having a specific surface area over 200 $m^2/g$ causes biased distribution of an electrolyte toward the negative electrode, which may lead to an electrolyte shortage in a positive electrode. Accordingly, it is difficult to improve output characteristics and charge/discharge cycle characteristics. A more preferable range of the specific surface area is 5 to 50 $m^2/g$. Herein, a specific surface area of the negative electrode indicates a surface area per 1 g of the negative electrode active material layer (excluding the weight of the current collector). Note that the negative electrode active material layer is a porous layer containing a negative electrode active material, a conductive agent, and a binder supported on the current collector.

The negative electrode preferably has porosity (excluding the current collector) from 20 to 50%. Such a structure yields a high-density negative electrode that has an excellent affinity to an electrolyte. It is more preferable that the negative electrode have porosity from 25 to 40%.

As the conductive agent, for example, carbon materials are employable. Examples of the carbon material include acetylene black, carbon black, coke, carbon fiber, graphite, aluminum powder, and TiO. More preferable examples of the carbon material include powders of coke, graphite, or TiO having an average particle size of 10 μm or less and heated at a temperature from 800° C. to 2000° C., or carbon fibers having an average fiber diameter of 1 μm or less. With regard to a specific surface area determined by BET based on $N_2$ adsorption, it is preferable that the carbon material have a specific surface area of 10 $m^2/g$ or more.

Examples of the binder include polytetrafluoroethylene (PTFE), polyvinylidene fluoride (PVdF), fluorine rubber, styrene butadiene rubber, and a core-shell binder.

It is preferable that the negative electrode active material, the conductive agent, and the binding agent be compounded at rates of 70% by mass or more and 96% by mass or less, 2% by mass or more and 28% by mass or less, and 2% by mass or more and 28% by mass or less, respectively. The conductive agent at a rate below 2% by mass may cause a decrease in current collection performance of the negative electrode active material layer and a decrease in large current characteristics of the non-aqueous electrolyte battery. Furthermore, the binding agent at a rate below 2% by mass may cause a decrease in binding property between the negative electrode active material layer and the negative electrode current collector, and a decrease in cycle characteristics. On the other hand, from a viewpoint of a high capacity, it is preferable that the conductive agent and the binding agent both be compounded at a rate of 28% by mass or less.

It is preferable that the negative electrode current collector include an aluminum foil that is electrochemically stable at a potential range higher than 1.0 V or include an aluminum alloy foil containing an element such as Mg, Ti, Zn, Mn, Fe, Cu, and Si. The negative electrode current collector preferably has a thickness of 5 μm or more and 20 μm or less. The negative electrode current collector having such a thickness balances the strength and downsizing of the negative electrode.

The negative electrode is prepared, for example, by the following method. First, a negative electrode active material, a conductive agent, and a binding agent are suspended in a solvent to prepare slurry. The slurry is applied to one side or both sides of a negative electrode current collector and dried to form a negative electrode active material layer. Then, the negative electrode active material layer is pressed. Alternatively, the negative electrode active material, the conductive agent, and the binding agent may be formed into pellets, and these pellets may be used as a negative electrode active material layer.

Non-Aqueous Electrolyte

As the non-aqueous electrolyte, liquid non-aqueous electrolytes or gel non-aqueous electrolytes are employable. A liquid non-aqueous electrolyte is prepared by dissolving an electrolyte in an organic solvent. The electrolyte preferably has a concentration from 0.5 to 2.5 mol/l. A gel non-aqueous electrolyte is prepared by compounding a liquid non-aqueous electrolyte and a polymeric material. A liquid non-aqueous electrolyte is preferable because it has higher Li conductivity and better input/output characteristics than a gel non-aqueous electrolyte.

Examples of the electrolyte include lithium salts such as lithium perchlorate ($LiClO_4$), lithium hexafluorophosphate ($LiPF_6$), lithium tetrafluoroborate ($LiBF_4$), lithium arsenic hexafluoride ($LiAsF_6$), lithium trifluorometasulfonate ($LiCF_3SO_3$) and lithium bis(trifluoromethylsulfonyl)imide $[LiN(CF_3SO_2)_2]$. These electrolytes may be used independently, or two or more of the electrolytes may be combined. It is preferable that the electrolyte contain $LiPF_6$.

Examples of the organic solvent are as follows.
Cyclic carbonates such as propylene carbonate (PC), ethylene carbonate (EC), and vinylene carbonate
Linear carbonates such as diethyl carbonate (DEC), dimethyl carbonate (DMC), and methyl ethyl carbonate (MEC)
Cyclic ethers such as tetrahydrofuran (THF), 2-methyltetrahydrofuran (2MeTHF), dioxolane (DOX)
Linear ethers such as dimethoxyethane (DME), di-ethoxyethane (DEE)
γ-butyrolactone (GBL), α-methyl γ-butyrolactone (MBL), acetonitrile (AN), and sulfolane (SL).
These organic solvents may be used independently, or two or more of the organic solvents may be combined.

More preferable examples of the organic solvent include mixed solvents in which two or more carbonates selected from the group consisting of propylene carbonate (PC), ethylene carbonate (EC), diethyl carbonate (DEC), dimethyl carbonate (DMC), and methyl ethyl carbonate (MEC) are mixed, and include mixed solvents containing γ-butyrolactone (GBL). The use of such mixed solvents yields a non-aqueous electrolyte battery with excellent low-temperature characteristics. To the electrolytic solution, various types of electrolytic solution additives including Mg ions and Co ions may be added.

Examples of the polymeric material include polyvinylidene fluoride (PVdF), polyacrylonitrile (PAN), and polyethylene oxide (PEO).

Separator

As the separator, for example, porous films including a material such as polyethylene, polypropylene, cellulose, and polyvinylidene fluoride (PVdF) or synthetic resin non-woven fabrics are employable. Among those examples, a porous film including polyethylene or polypropylene is preferable from a viewpoint of improving safety since such a film fuses at a certain temperature and interrupts currents.

Exterior Member

As the exterior member, a bag-like container or metallic container including a laminate film is employed.

The shape may be, for example, flat, square, cylindrical, coin, button, sheet, or laminate. In addition to a small battery mounted on a portable electronic device, note that the exterior member may be a large battery loaded on a two-wheel to four-wheel vehicle.

As the laminate film, a multilayer film in which a metallic layer is interposed between resin films is employed. It is preferable that the metallic layer be aluminum foil or aluminum alloy foil from the aspect of weight reduction. As the resin film, for example, polymeric materials such as polypropylene (PP), polyethylene (PE), nylon, and polyethylene terephthalate (PET) are employable. The laminate film may be sealed by heat fusion and formed into the shape of the exterior member. The laminate film preferably has a thickness of 0.2 mm or less. In addition, the laminate film used for the exterior member is not limited to one in which a metallic layer is interposed between two resin films. The laminate film may be a multilayer film including a metallic layer and a resin layer that covers the metallic layer.

The metallic container includes an aluminum or aluminum alloy. The aluminum alloy preferably contains elements such as magnesium, zinc, and silicon. On the other hand, amounts of transition metals such as iron, copper, nickel, and chromium are preferably 100 ppm or less. Such a structure enables progressive improvement in long-term reliability and heat release under high temperature environments. The metallic container preferably has a thickness of 0.5 mm or less, and more preferably 0.2 mm or less.

Positive Electrode Terminal

The positive electrode terminal includes a conductive material which is electrically stable at a potential of 3.0 V or more and 4.5 V or less with respect to lithium ion metal. The positive electrode terminal preferably includes an aluminum or aluminum alloy containing an element such as Mg, Ti, Zn, Mn, Fe, Cu, and Si. The positive electrode terminal preferably includes a material similar to that of the positive electrode current collector in order to reduce contact resistance against the positive electrode current collector.

Negative Electrode Terminal

The negative electrode terminal includes a conductive material which is electrically stable at a potential of 1.0 V or more and 3.0 V or less with respect to lithium ion metal. The negative electrode terminal preferably includes an aluminum or aluminum alloy containing an element such as Mg, Ti, Zn, Mn, Fe, Cu, and Si. The negative electrode terminal preferably includes a material similar to that of the negative electrode current collector in order to reduce contact resistance against the negative electrode current collector.

Figure 2:
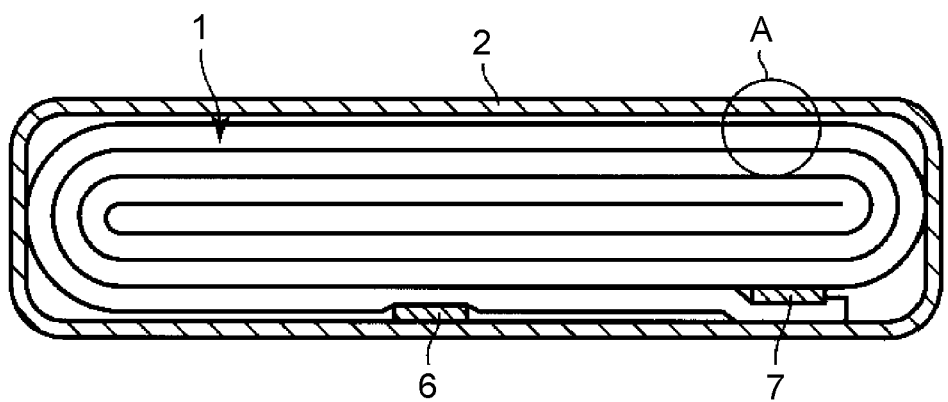
FIG. 2 is a schematic cross-sectional showing an example of a non-aqueous electrolyte battery according to a second embodiment.

Hereinafter, the non-aqueous electrolyte battery according to the second embodiment will be described more specifically with reference to FIGS. 2 and 3. However, the non-aqueous electrolyte battery according to the second embodiment is not limited to the following electrode group and the like. FIG. 2 is a cross-sectional view of the flat non-aqueous electrolyte battery according to the second embodiment, and FIG. 3 is an enlarged cross-sectional view of a part A in FIG. 2.

A flat wound electrode group 1 is housed in a bag-like exterior member 2 including a laminate film in which a metallic layer is interposed between two resin films. The flat wound electrode group 1 is formed by spirally winding and pressing a laminate in which a negative electrode 3, a separator 4, a positive electrode 5, and the separator 4 are laminated in this order from the outside. With regard to the outermost layer negative electrode 3, a negative electrode active material layer 3b containing a negative electrode active material is formed on one surface (an inner surface side) of a negative electrode current collector 3a as shown in FIG. 3. With regard to other negative electrodes 3, a negative electrode active material layer 3b is formed on both sides of a negative electrode current collector 3a. The positive electrode 5 has a configuration in which a positive electrode active material layer 5b is formed on both surfaces of a positive electrode current collector 5a.

Near the outer periphery of the wound electrode group 1, a negative electrode terminal 6 is connected to the negative electrode current collector 3a of the outermost layer negative electrode 3, and a positive electrode terminal 7 is connected to the positive electrode current collector 5a of the inner positive electrode 5. The negative electrode terminal 6 and the positive electrode terminal 7 are extended outward from an opening of the bag-like exterior member 2. For example, a liquid non-aqueous electrolyte is injected from the opening of the bag-like exterior member 2. The wound electrode group 1 and the liquid non-aqueous electrolyte are completely sealed by heat-sealing the opening of the bag-like exterior member 2 via the negative electrode terminal 6 and the positive electrode terminal 7.

Figure 3:
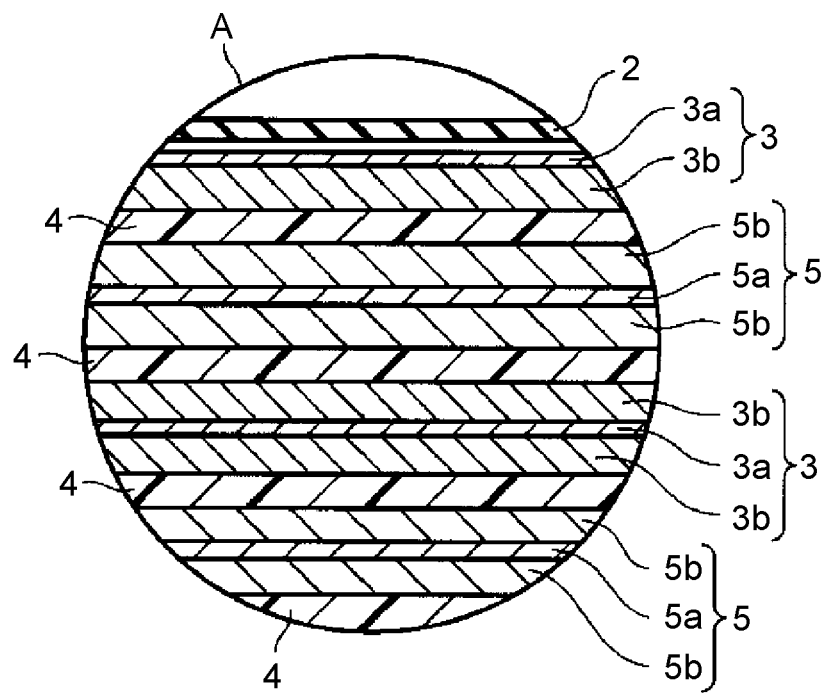
FIG. 3 is an enlarged cross-sectional view schematically showing a part A in FIG. 2.
Figure 4:
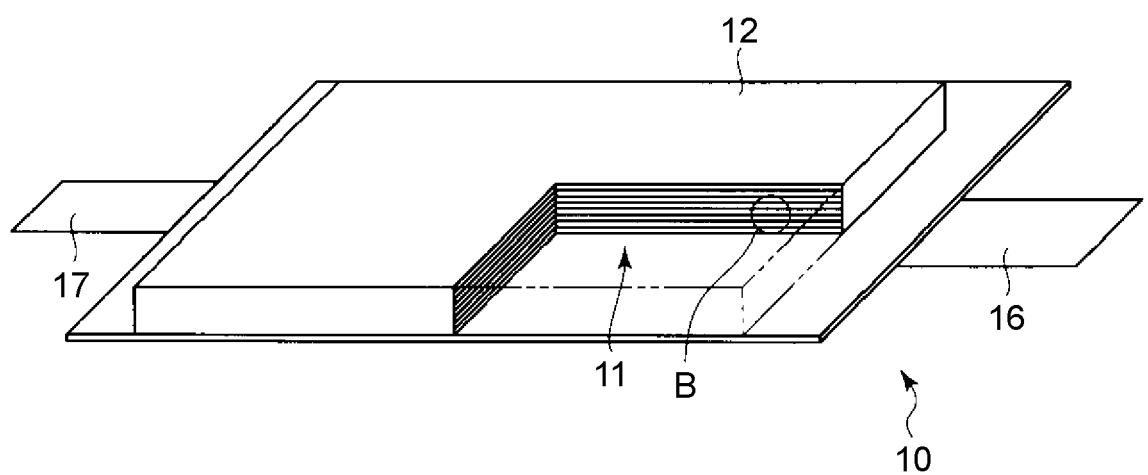
FIG. 4 is a partial cutaway perspective view showing another example of the non-aqueous electrolyte battery according to the second embodiment.
Figure 5:
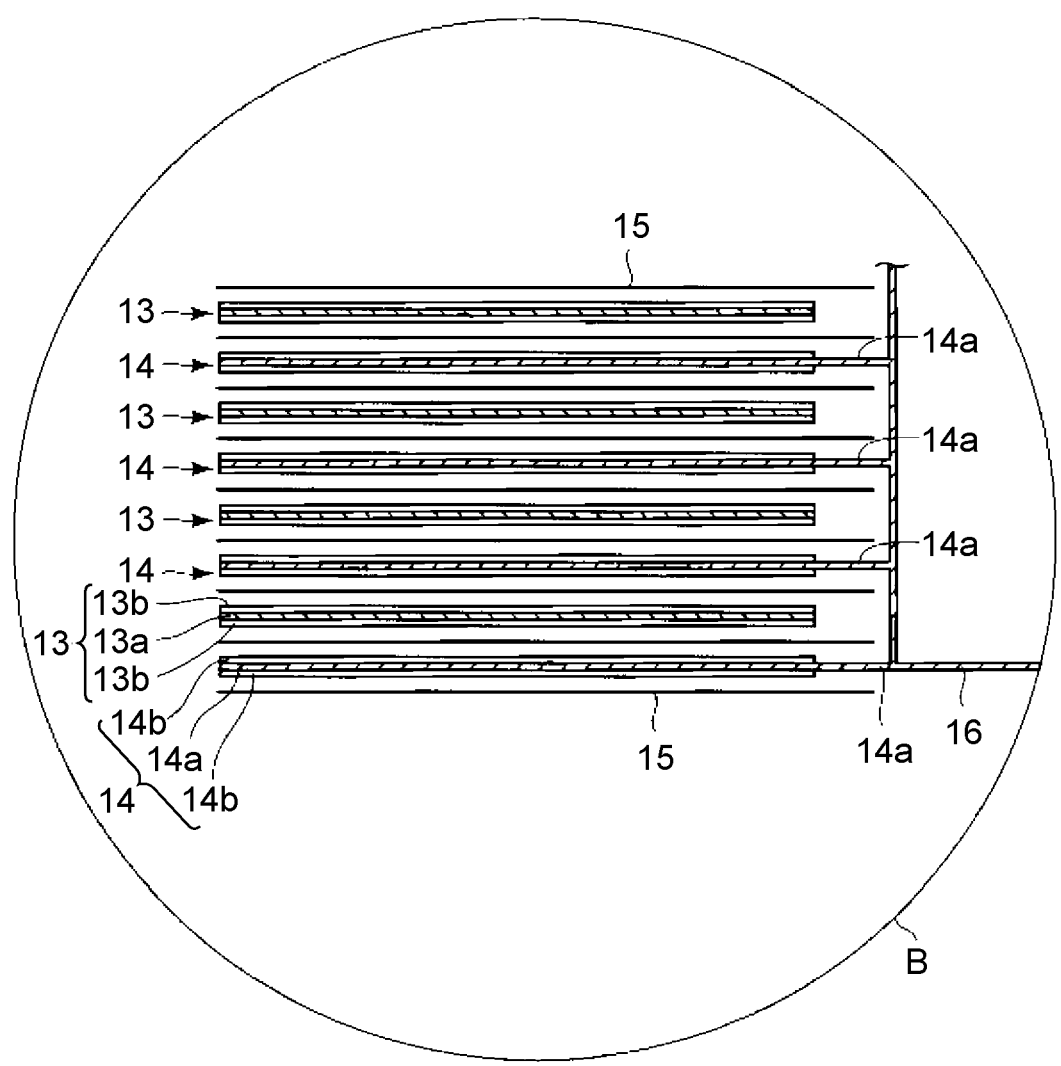
FIG. 5 is an enlarged cross-sectional view schematically showing a part B in FIG. 4.

The non-aqueous electrolyte battery according to the second embodiment is not limited to the configuration shown in FIGS. 2 and 3, and may have, for example, the configuration shown in FIG. 4 and FIG. 5. FIG. 4 is a partial cutaway perspective view schematically showing another flat non-aqueous electrolyte battery 10 according to the first embodiment, and FIG. 5 is an enlarged cross-sectional view of a part B in FIG. 4.

A laminated electrode group 11 is housed in an exterior member 12 including a laminate film in which a metallic layer is interposed between two resin films. The laminated electrode group 11 has a structure, as shown in FIG. 5, in which a positive electrode 13 and a negative electrode 14 are laminated alternately with a separator 15 interposed therebetween. There is a plurality of positive electrodes 13, and each includes a current collector 13a and a positive electrode active material layer 13b supported on both sides of the current collector 13a. There is a plurality of negative electrodes 14, and each includes a current collector 14a and a negative electrode active material layer 14b supported on both sides of the current collector 14a. In each negative electrode 14, one side of the current collector 14a protrudes from the positive electrode 13. The protruding current collector 14a is electrically connected to a belt-like negative electrode terminal 16. A leading end of the belt-like negative electrode terminal 16 is drawn outward from the exterior member 12. Although not shown, with regard to the current collector 13a of the positive electrode 13, a side opposite to the side where the current collector 14a protrudes from the negative electrode 14 protrudes. The current collector 13a protruding from the negative electrode 14 is electrically connected to a belt-like positive electrode terminal 17. As shown in FIG. 4, a leading end of the belt-like positive electrode terminal 17 is disposed on a side opposite to the negative electrode terminal 16 and is drawn outward from a side of the exterior member 12.

In this manner, the non-aqueous electrolyte battery according to the second embodiment includes the positive electrode, the negative electrode containing a titanium-containing oxide, and the non-aqueous electrolyte, in which the positive electrode is the electrode according to the first embodiment. Such a non-aqueous electrolyte battery prevents an electrolyte decomposition reaction and prevents gas generation while maintaining input/output characteristics of the cell, which makes it possible to provide a non-aqueous electrolyte battery having excellent stability in cycle characteristics.

Third Embodiment

A battery pack according to a third embodiment includes one or more of the non-aqueous electrolyte batteries (unit cells) according to the second embodiment. In a case where the battery pack includes a plurality of unit cells, the unit cells are electrically connected in series or in parallel.

Such a battery pack 20 will be described in detail with reference to FIGS. 6, 7 and 8. The flat battery shown in FIG. 2 is employable as a unit cell.

A plurality of unit cells 21 including the flat non-aqueous electrolyte battery shown in FIG. 2 is laminated in such a manner that the negative electrode terminal 6 and the positive electrode terminal 7 extended outward are aligned in the same direction. The unit cells 21 are fastened by an adhesive tape 22, whereby forming an assembled battery 23. These unit cells 21 are electrically connected in series as shown in FIG. 7.

A printed wiring board 24 is disposed to face a side surface of each unit cell 21 from which the negative electrode terminal 6 and the positive electrode terminal 7 are extended. As shown in FIGS. 7 and 8, a thermistor 25, a protection circuit 26, and a terminal 27 that carries currents to an external device are mounted on the printed wiring board 24. An insulating plate (not shown) is attached to a surface of the printed wiring board 24 that faces the assembled battery 23 in order to avoid unnecessary connection with wires of the assembled battery 23.

A positive electrode lead 28 is connected to the positive electrode terminal 7 placed in the lowermost layer of the assembled battery 23. A leading end of the positive electrode lead 28 is inserted into a positive electrode connector 29 of the printed wiring board 24 and is electrically connected thereto. A negative electrode lead 30 is connected to the negative electrode terminal 6 placed in the uppermost layer of the assembled battery 23. A leading end of the negative electrode lead 30 is inserted into a negative electrode connector 31 of the printed wiring board 24 and is electrically connected thereto. The connectors 29 and 31 are connected to the protection circuit 26 through traces 32 and 33 formed on the printed wiring board 24.

Figure 6:
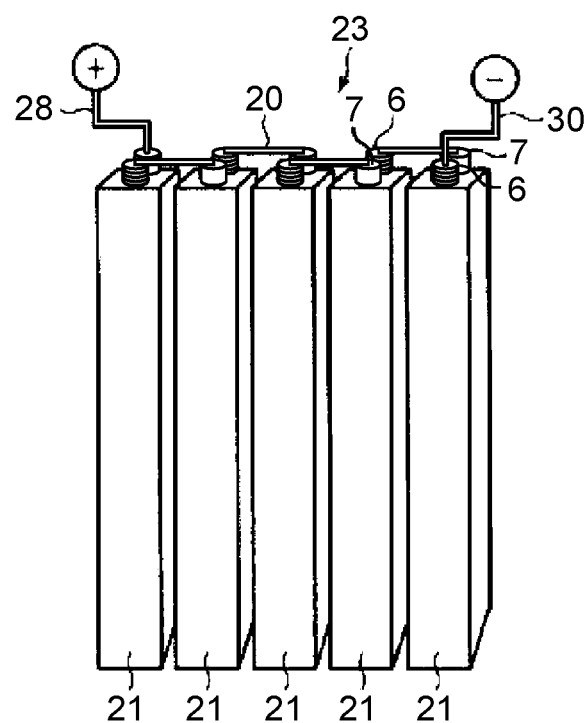
FIG. 6 is a schematic perspective view showing an example of an assembled battery according to a third embodiment.
Figure 7:
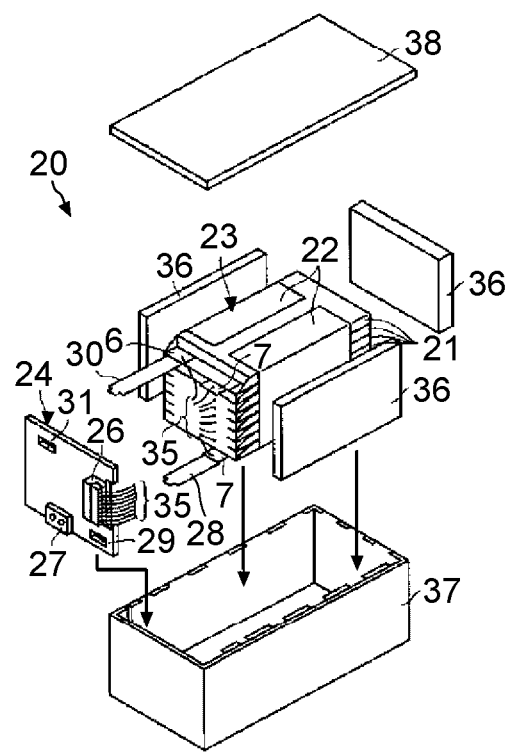
FIG. 7 is an exploded perspective view showing an example of a battery pack according to the third embodiment.
Figure 8:
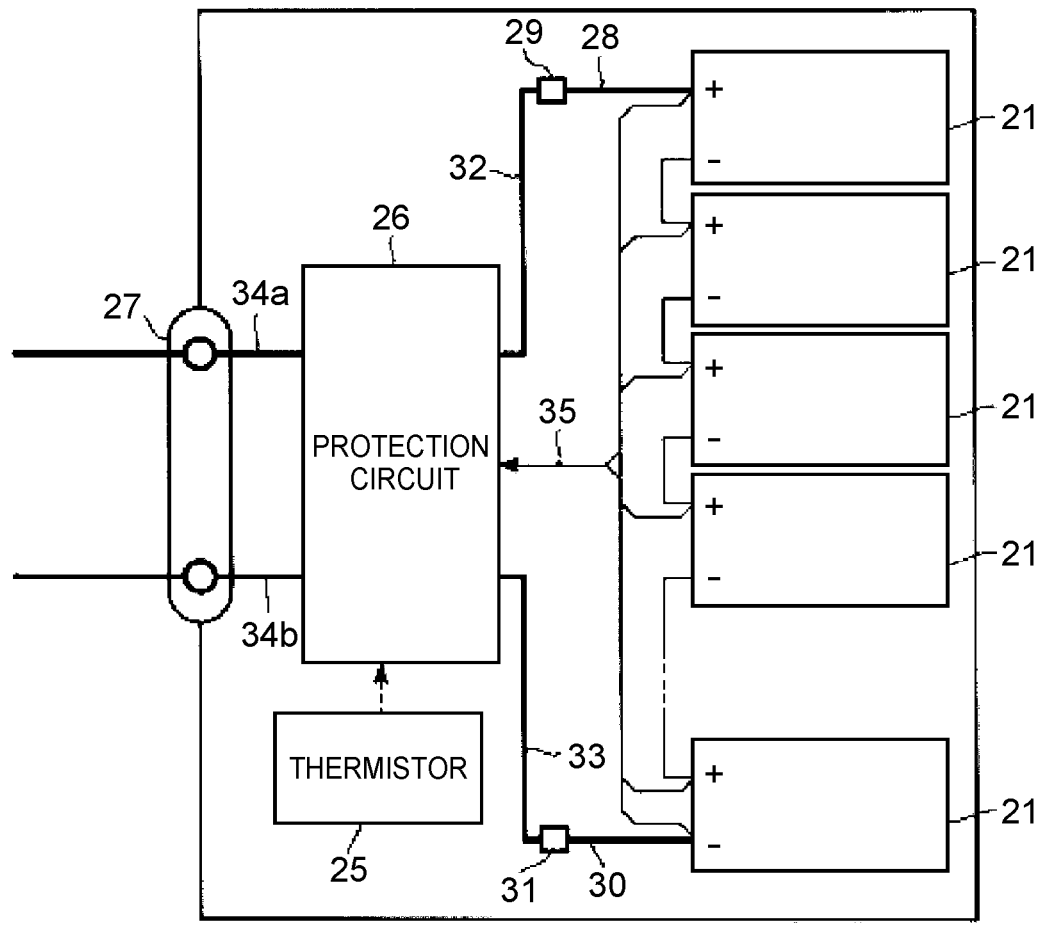
FIG. 8 is a block diagram showing an electric circuit of the battery pack of FIG. 7.

FIG. 8 is a block diagram showing an electric circuit of the battery pack of FIG. 7. Referring to FIG. 8, the thermistor 25 is used to detect temperatures of the unit cells 21. The thermistor 25 detects temperatures of the unit cells 21, and detection signals are transmitted to the protection circuit 26. Under a predetermined condition, the protection circuit 26 cuts off a plus wire 34a and a minus wire 34b disposed between the protection circuit 26 and the terminal 27 that carries currents to an external device. The predetermined condition is, for example, when a detected temperature of the thermistor 25 is equal to or higher than a predetermined temperature. In addition, the predetermined condition is, for example, when the thermistor 25 detects overcharge, overdischarge, or overcurrent of the unit cells 21. Overcharge and the like is detected for each unit cell 21 or the entire unit cells 21. When detecting each unit cell 21, a voltage of the cell may be detected. Alternatively, a positive electrode potential or a negative electrode potential may be detected. In the latter case, a lithium electrode used as a reference electrode is inserted into each unit cell 21. In FIGS. 6 and 7, a wire 35 for voltage detection is connected to each of the unit cells 21, and detection signals are transmitted to the protection circuit 26 through the wires 35.

Protective sheets 36 including rubber or resin are disposed on three side surfaces of the assembled battery 23 and not on the side surface from which the positive electrode terminal 7 and the negative electrode terminal 6 protrude.

The assembled battery 23 is housed in a housing 37 together with the protective sheets 36 and the printed wiring board 24. In other words, the protective sheets 36 are disposed on both inner surfaces of the housing 37 in a long-side direction and an inner surface of the housing 37 in a short-side direction, and the printed wiring board 24 is disposed on the opposite inner surface in the short-side direction. The assembled battery 23 is placed in a space surrounded by the protective sheets 36 and the printed wiring board 24. A cover 38 is attached to an upper surface of the housing 37.

A heat-shrinkable tape may be used in place of the adhesive tape 22 for fixing the assembled battery 23. In this case, protective sheets 36 are disposed on both sides of the assembled battery 23, and after a heat-shrinkable tube is wrapped around the assembled battery, the heat-shrinkable tube is thermally shrunk to bind the assembled battery 23.

Although FIGS. 6 and 7 show the unit cells 21 connected in series, the unit cells 21 may be connected in parallel in order to increase a battery capacity. Alternatively, an assembled battery pack may be connected in series or in parallel.

Although the assembled battery 23 shown in FIG. 6 and the battery pack 20 shown in FIG. 7 include the plurality of unit cells 21, the battery pack according to the third embodiment may include one unit cell 21.

In addition, an embodiment of a battery pack is appropriately changed depending on applications. The battery pack according to the present embodiment is suitably used for applications that require an excellent cycle performance when outputting a large current. Specifically, the battery pack according to the present embodiment is employable as a power supply of a digital camera.

The battery pack according to the present embodiment includes the non-aqueous electrolyte battery according to the second embodiment, and thus enables excellent cycle characteristics.

Fourth Embodiment

According to a fourth embodiment, there is provided a vehicle. This vehicle is equipped with the battery pack according to the third embodiment.

In the vehicle according to the fourth embodiment, a battery pack recovers, for example, a regenerative energy from the power of the vehicle.

Examples of the vehicle according to the fourth embodiment include a two-wheel to four-wheel hybrid electric vehicle, a two-wheel to four-wheel electric vehicle, an assisted bicycle, and a railway vehicle.

A mounting position of the battery pack in the vehicle according to the fourth embodiment is not particularly limited. For example, when the battery pack is mounted on an automobile, the battery pack may be mounted on an engine room of the automobile, on a rear part of a vehicle body, or under a seat.

Next, an example of the vehicle according to the fourth embodiment will be described with reference to the drawings.

Figure 9:
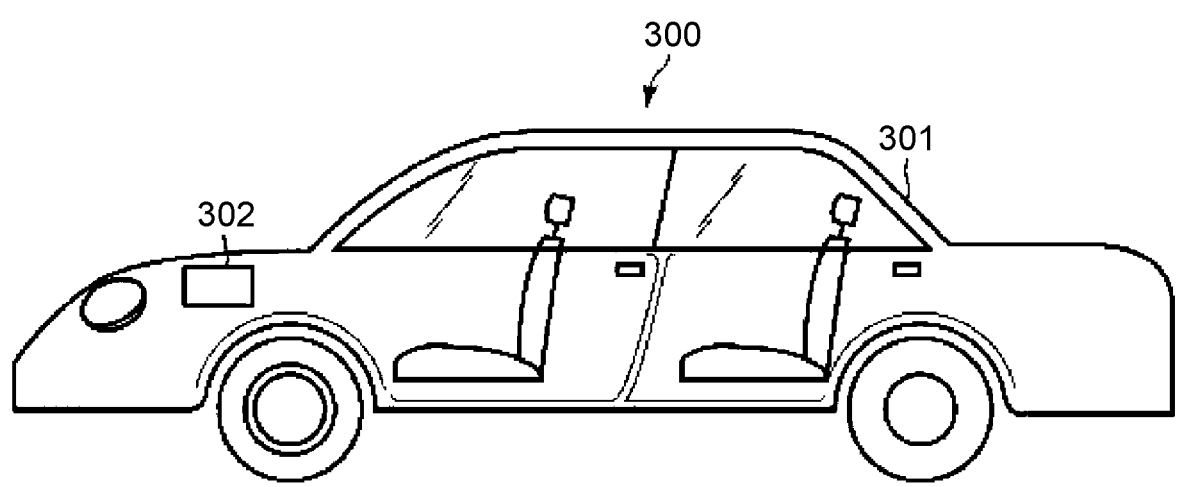
FIG. 9 is a schematic cross-sectional view showing an example of a vehicle according to a fourth embodiment.

FIG. 9 is a cross-sectional view schematically showing an example of the vehicle according to the fourth embodiment.

A vehicle 300 shown in FIG. 9 includes a vehicle body 301 and a battery pack 302. The battery pack 302 may be the battery pack according to the third embodiment.

The vehicle 300 shown in FIG. 9 is a four-wheel automobile. As the vehicle 300, for example, a two-wheel to four-wheel hybrid electric vehicle, a two-wheel to four-wheel electric vehicle, an assisted bicycle, and a railway vehicle are employable.

The vehicle 300 may have a plurality of battery packs 302 mounted thereon. In this case, the battery packs 302 may be connected in series or in parallel, or may be connected in series and parallel.

The battery packs 302 are mounted on an engine room anterior to the vehicle body 301. Mounting positions of the battery packs 302 are not particularly limited. The battery packs 302 may be mounted on a rear part of the vehicle body 301 or under a seat. The battery packs 302 are employable as power supplies of the vehicle 300. Furthermore, the battery packs 302 recovers a regenerative energy from the power of the vehicle 300.

An implementation of the vehicle according to the fourth embodiment will now be described with reference to FIG. 10.

Figure 10:
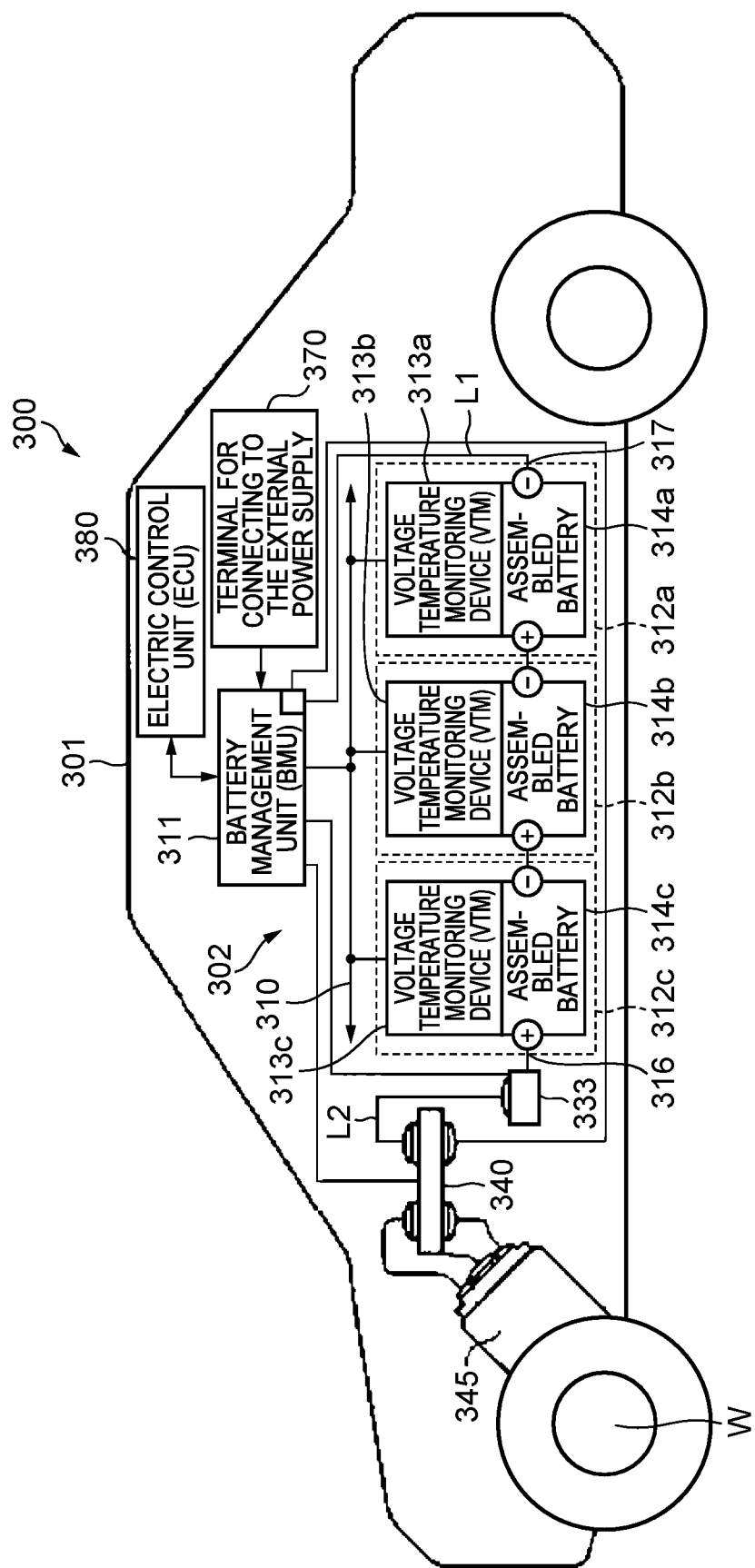
FIG. 10 is another schematic cross-sectional view showing the example of the vehicle of FIG. 9 according to the fourth embodiment.

FIG. 10 is a view schematically showing concrete example of the vehicle according to the fourth embodiment. A vehicle 300 shown in FIG. 10 is an electric vehicle.

The vehicle 300 shown in FIG. 10 includes a vehicle main body 301, a vehicle power supply 302 (the battery pack in FIG. 9), a vehicle electric control unit (ECU) 380 as a higher-level controller of the vehicle power supply 302, an external terminal (terminal for connecting to the external power supply) 370, an inverter 340, and a drive motor 345.

The vehicle 300 has the vehicle power supply 302 mounted, for example, on an engine room, on a rear part of the vehicle body, or under a seat. In the vehicle 300 shown in FIG. 10, a mounting location of the vehicle power supply 302 is illustrated schematically.

The vehicle power supply 302 includes a plurality of (for example, three) battery packs 312*a*, 312*b*, and 312*c*, a battery management unit (BMU) 311, and a communication bus 310.

The three battery packs 312*a*, 312*b*, and 312*c* are electrically connected in series. The battery pack 312*a* includes an assembled battery 314*a* and a voltage temperature monitoring device (VTM) 313*a*. The battery pack 312*b* includes an assembled battery 314*b* and a VTM 313*b*. The battery pack 312*c* includes an assembled battery 314*c* and a VTM 313*c*. The battery packs 312*a*, 312*b*, and 312*c* are independently removable from one another and replaceable with other battery packs 312.

Each of the assembled batteries 314*a* to 314*c* includes a plurality of unit cells connected in series. At least one of the plurality of unit cells is the non-aqueous electrolyte battery according to the second embodiment. The assembled batteries 314*a* to 314*c* charge and discharge through a positive electrode terminal 316 and a negative electrode terminal 317.

Communicating with the VTMs 313*a* to 313*c*, the BMU 311 collects information associated with maintenance of the vehicle power supply 302 and collects information associated with, for example, voltages and temperatures of the unit cells included in the assembled batteries 314*a* to 314*c* in the vehicle power supply 302.

The communication bus 310 is connected between the BMU 311 and the VTMs 313*a* to 313*c*. The communication bus 310 shares a set of communication lines among a plurality of nodes (the BMU and one or more VTMs). The communication bus 310 is made according to, for example, control area network (CAN) standards.

Based on commands from the BMU 311 by communication, the VTMs 313a to 313c measure voltages and temperatures of individual unit cells included in the assembled batteries 314a to 314c. Note that a temperature may be measured at few points of one assembled battery, and it is not always required to measure temperatures of all the unit cells.

The vehicle power supply 302 may also include an electromagnetic contactor (for example, a switch device 333 shown in FIG. 10) for turning on and off connections between the positive electrode terminal 316 and the negative electrode terminal 317. The switch device 333 includes a pre-charge switch (not shown) which is turned on when the assembled batteries 314a to 314c are charged, and a main switch (not shown) which is turned on when a battery output is supplied to a load. The pre-charge switch and the main switch are provided with a relay circuit (not shown) which is turned on or off by signals supplied to a coil disposed close to switch elements.

The inverter 340 converts an input DC voltage into a three-phase alternating current (AC) high voltage used for motor driving. Three-phase output terminals of the inverter 340 are connected to three-phase input terminals of the drive motor 345, respectively. The inverter 340 controls an output voltage based on control signals from the BMU 311 or the vehicle ECU 380 that controls the entire operations of the vehicle.

The drive motor 345 is rotated by an electric power supplied from the inverter 340. This rotation is transmitted to an axle and a drive wheel W, for example, via a differential gear unit.

Although not shown, the vehicle 300 is provided with a regenerative braking mechanism. The regenerative braking mechanism rotates the drive motor 345 when the vehicle 300 is braked, and converts a kinetic energy into a regenerative energy as electric energy. The regenerative energy recovered by the regenerative braking mechanism is input to the inverter 340 and converted into a direct current. The direct current is input to the vehicle power supply 302.

One terminal of a connection line L1 is connected to the negative electrode terminal 317 of the vehicle power supply 302 from a current detection unit (not shown) in the BMU 311. The other terminal of the connection line L1 is connected to a negative electrode input terminal of the inverter 340.

One terminal of a connection line L2 from the current detection unit in the BMU 311 is connected to the positive electrode terminal 316 of the vehicle power supply 302 via the switch device 333. The other terminal of the connection line L2 is connected to a positive electrode input terminal of the inverter 340 via the switch device 333.

The external terminal 370 is connected to the BMU 311. The external terminal 370 may be connected to, for example, an external power supply.

The vehicle ECU 380 coordinates the BMU 311 together with other devices in response to an operation input from a driver or the like, and controls the entire vehicle. Through a communication line, data transfer is performed between the BMU 311 and the vehicle ECU 380. The data is associated with maintenance of the vehicle power supply 302 such as a remaining capacity of the vehicle power supply 302.

The vehicle according to the fourth embodiment includes the battery pack according to the third embodiment. In other words, being provided with the battery pack with an excellent cycle performance, the vehicle according to the fourth embodiment has an excellent cycle performance. Furthermore, since the battery pack has an excellent life performance, it is possible to offer a highly reliable vehicle.

EXAMPLES

Examples are hereinafter described, but it should be noted that the present invention is not limited to the following Examples as long as it does not depart from the scope of the present invention.

Example 1

Slurry was prepared by mixing positive electrode active material powders (90 wt % of $LiNi_{0.5}Mn_{1.5}O_4$, 10 wt % of $LiCoPO_4$), 5 wt % of acetylene black, 5 wt % of polyvinylidene fluoride (PVdF), and N-methylpyrrolidone (NMP). The slurry was applied on both sides of a 15-μm-thick aluminum foil positive electrode current collector. After the slurry was dried, the slurry was pressed to prepare a positive electrode that includes a positive electrode active material layer having a density of 2.7 g/cm$^3$. In addition, using a negative electrode active material ($Li_4Ti_5O_{12}$), a negative electrode was prepared in a similar manner to the positive electrode.

The obtained positive electrode and the negative electrode were alternately laminated via a polypropylene separator, whereby preparing an electrode group. After an Al terminal was ultrasonically welded to the electrode group, the electrode group was stored in a pack including a laminate film and dried in vacuum at 80° C. for 24 hours. The laminate film was obtained by forming a polypropylene layer on both sides of a 40-μm-thick aluminum foil. The total thickness of the laminate film was 0.1 mm. A liquid non-aqueous electrolyte in which an $LiPF_6$-containing electrolyte was dissolved in an organic solvent was injected into the laminate film pack housing the electrode group, and the pack was completely sealed by heat sealing.

Table 1 shows the positive electrode active materials, the negative electrode active material, and the state of the non-aqueous electrolyte used in Example 1.

An evaluation method of a non-aqueous electrolyte battery is shown below.

Charge/Discharge Cycle Test

The non-aqueous electrolyte battery obtained was charged and discharged at 25° C., at a voltage from 3.4 to 2.0 V, and at a current corresponding to 0.2C when 1-hour rate of cell design capacity was defined as 1C. Accordingly, a capacity of 1000 mAh was obtained. Then, the non-aqueous electrolyte battery was charged and discharged for 200 cycles at 1C rate, at 25° C., and at a voltage from 3.4 to 2.0 V. Accordingly, a maintenance rate after 500 cycles was found to be 90%. Furthermore, an amount of gas inside a cell after the cycle test was examined by the Archimedes method, and the amount of gas was 2.0 cc.

With respect to the electrode after the charge/discharge cycle test, an average particle size of the positive electrode active materials and a ratio of average particle size of the positive electrode active materials, a crystallite diameter by XRD measurement, and a ratio by weight of the positive electrode active materials were measured. These results are shown in Table 3 together with the maintenance rate and the amount of gas. Similarly, Table 3 shows the results of Examples 2 to 12, and Table 4 shows the results of Comparative Examples 1 to 6.

Measurement of Average Particle Sizes and Ratio of Average Particle Size of Positive Electrode Active Materials Average particle sizes of $LiNi_{0.5}Mn_{1.5}O_4$ and $LiCoPO_4$ as the positive electrode active material powders were measured. A powder/coating liquid particle size distribution measurement device (MT3300EXII, a product of Nikkiso Microtrac) was used in the measurement. The measurement was performed in the absorption mode after dispersion by ultrasonic irradiation at 30 W for 60 seconds. Provided that average particle sizes of $LiNi_{0.5}Mn_{1.5}O_4$ and $LiCoPO_4$ were d50(Ni—Mn) and d50(Co) respectively, d50(Ni—Mn)=9.8 μm, d50(Co)=0.5 μm, and d50(Ni—Mn)/d50(Co)=19.6.

Measurement of Crystallite Diameter

XRD measurement was performed on the electrode prepared with D2 Phaser available from BRUKER. The scanning speed was set to 0.002 degree/step with a diffraction angle 2θ from 10 to 90 degrees, using Cu—Kα ray as a radiation source. $LiCoPO_4$ was identified from the obtained XRD pattern (spectrum). From a half value width of a main peak of $LiCoPO_4$ observed around 38 degrees, a crystallite diameter (d) was calculated by the Scherrer equation to be 48 nm.

Ratio by Weight of Positive Electrode Active Materials: B/A

After the cell was completely discharged, the cell was disassembled under an inert atmosphere, and the positive electrode was cut out. The (cut out) positive electrode was impregnated in a mixed solvent of propylene carbonate and diethyl ether for 10 minutes at a volume ratio of 1:1 to dissolve lithium salts remaining in the electrode active material layer. Furthermore, the positive electrode was impregnated in a single solvent of diethyl ether for 10 minutes to remove the solvent from the electrode active material layer. The washed electrode was punched out to 14 mm in diameter, placed in a measurement holder, and subjected to XRD measurement while an inert atmosphere was maintained. In XRD measurement, a desk-top X-ray diffractometer D2 PHASER available from BRUKER is employed. With regard to measurement conditions, a diffraction angle 2θ relative to a Cu—Kα radiation source was from 10 degrees to 80 degrees, a step width was 0.02 degrees, and the integration time was 2.0 seconds. An obtained diffraction peak was analyzed by the Rietveld method to identify a ratio by weight of the cobalt-containing oxide to a total of weights of the cobalt-containing oxide and the lithium nickel manganese oxide. Accordingly, a ratio by weight was 10 wt %. In Table 3, the ratio by weight is denoted by "B/A" where a total of weights of the cobalt-containing oxide and the lithium nickel manganese oxide is A and the weight of the cobalt-containing oxide is B. Other detailed results of Examples and Comparative Examples are shown in the table.

Example 2

Example 2 was performed in a similar manner to Example 1 except that $LiCo_{0.8}Fe_{0.2}PO_4$, instead of $LiCoPO_4$, was used as a positive electrode active material powder.

Example 3

Example 3 was performed in a similar manner to Example 1 except that $LiNi_{0.33}Mn_{0.33}Co_{0.33}O_2$, instead of $LiCoPO_4$, was used as a positive electrode active material powder.

Example 4

Example 4 was performed in a similar manner to Example 1 except that $LiCo_{0.5}Fe_{0.5}SiO_4$, instead of $LiCoPO_4$, was used as a positive electrode active material powder.

Example 5

Example 5 was performed in a similar manner to Example 1 except that a ratio by weight of positive electrode active material powders was $LiNi_{0.5}Mn_{1.5}O_4$:$LiCoPO_4$=80:20 (B/A=20 wt %).

Example 6

Example 6 was performed in a similar manner to Example 1 except that a ratio by weight of positive electrode active material powders was $LiNi_{0.5}Mn_{1.5}O_4$:$LiCoPO_4$=60:40 (B/A=40 wt %).

Example 7

Example 7 was performed in a similar manner to Example except that a gel electrolyte containing $LiPF_6$, polyethylene oxide (PEO), and polyacrylonitrile (PAN) was used as an electrolyte instead of a liquid non-aqueous electrolyte in which a $LiPF_6$-containing electrolyte was dissolved in an organic solvent.

Example 8

Example 8 was performed in a similar manner to Example except that $LiNi_{0.5}Mn_{1.5}O_4$ and $LiCoPO_4$ having different average particle sizes were used as positive electrode active materials ($LiNi_{0.5}Mn_{1.5}O_4$:d50 (Ni—Mn)=18.0 μm, $LiCoPO_4$: d50(Co)=1.8 μm), a ratio by weight of the positive electrode active materials was 95:5 (B/A=5 wt %), and $TiNb_2O_7$ was used as a negative electrode active material instead of $Li_4Ti_5O_{12}$.

Example 9

Example 9 was performed in a similar manner to Example except that $LiNi_{0.5}Mn_{1.5}O_4$ and $LiCoPO_4$ having different average particle sizes were used as positive electrode active materials ($LiNi_{0.5}Mn_{1.5}O_4$:d50 (Ni—Mn)=2.0 μm, $LiCoPO_4$:d50 (Co)=0.02 μm), a ratio by weight was 95:5 (B/A=5 wt %), and $TiNb_2O_7$ was used as a negative electrode active material instead of $Li_4Ti_5O_{12}$.

Example 10

Example 10 was performed in a similar manner to Example except that $LiNi_{0.5}Mn_{1.5}O_4$ and $LiCo_{0.5}Fe_{0.5}SiO_4$ having different average particle sizes were used as positive electrode active materials ($LiNi_{0.5}Mn_{1.5}O_4$:d50 (Ni—Mn)=15.0 μm, $LiCo_{0.5}Fe_{0.5}SiO_4$:d50(Co)=0.06 μm) and a ratio by weight was 95:5 (B/A=5 wt %).

Example 11

Example 11 was performed in a similar manner to Example except that $LiNi_{0.5}Mn_{1.45}Cu_{0.05}O_4$ (d50 (Ni—

Mn)=9.2 μm), instead of $LiNi_{0.5}Mn_{1.5}O_4$, was used as a positive electrode active material.

Example 12

Example 12 was performed in a similar manner to Example 1 except that a ratio by weight (B/A) of positive electrode active material powders was 5 wt % and an average particle size of a positive electrode active material $LiNi_{0.5}Mn_{1.5}O_4$ was changed (d50=2.0 μm).

Comparative Example 1

Comparative Example 1 was performed in a similar manner to Example 1 except that $LiCoPO_4$ was not added to a positive electrode active material powder.

Comparative Example 2

Comparative Example 2 was performed in a similar manner to Example 1 except that $LiCoPO_4$ (d50(Co)=4.2 μm) having an average particle size shown in Table 4 was used as a positive electrode active material powder and a ratio by weight of positive electrode active material powders was $LiNi_{0.5}Mn_{1.5}O_4$: $LiCoPO_4$=50:50 (B/A=50 wt %).

Comparative Example 3

Comparative Example 3 was performed in a similar manner to Example 1 except that $LiCoPO_4$ (d50(Co)=0.01 μm) having an average particle size shown in Table 4 was used as a positive electrode active material powder and a ratio by weight of positive electrode active material powders was $LiNi_{0.5}Mn_{1.5}O_4$:$LiCoPO_4$=50:50 (B/A=50 wt %).

Comparative Example 4

Comparative Example 4 was performed in a similar manner to Example 1 except that $LiCoPO_4$ (d50(Co)=0.01 μm) was used and a ratio by weight (B/A) of positive electrode active material powders was 60 wt %.

Comparative Example 5

Comparative Example 5 was performed in a similar manner to Example 1 except that $LiCoPO_4$ (d50(Co)=0.01 μm) was used and a ratio by weight (B/A) of positive electrode active material powders was 2 wt %.

Comparative Example 6

Comparative Example 6 was performed in a similar manner to Example 8 except that $LiCoPO_4$ was not added to a positive electrode active material powder.

TABLE 1

| | Positive electrode active materials | | Negative | |
| --- | --- | --- | --- | --- |
| | Lithium nickel manganese oxide | Cobalt-containing oxide | electrode active material | State of non-aqueous electrolyte |
| Example 1 | $LiNi_{0.5}Mn_{1.5}O_4$ | $LiCoPO_4$ | $Li_4Ti_5O_{12}$ | Liquid |
| Example 2 | $LiNi_{0.5}Mn_{1.5}O_4$ | $LiCo_{0.8}Fe_{0.2}PO_4$ | $Li_4Ti_5O_{12}$ | Liquid |
| Example 3 | $LiNi_{0.5}Mn_{1.5}O_4$ | $LiNi_{0.33}Mn_{0.33}Co_{0.33}O_2$ | $Li_4Ti_5O_{12}$ | Liquid |
| Example 4 | $LiNi_{0.5}Mn_{1.5}O_4$ | $LiCo_{0.5}Fe_{0.5}SiO_4$ | $Li_4Ti_5O_{12}$ | Liquid |
| Example 5 | $LiNi_{0.5}Mn_{1.5}O_4$ | $LiCoPO_4$ | $Li_4Ti_5O_{12}$ | Liquid |
| Example 6 | $LiNi_{0.5}Mn_{1.5}O_4$ | $LiCoPO_4$ | $Li_4Ti_5O_{12}$ | Liquid |
| Example 7 | $LiNi_{0.5}Mn_{1.5}O_4$ | $LiCoPO_4$ | $Li_4Ti_5O_{12}$ | Gel |
| Example 8 | $LiNi_{0.5}Mn_{1.5}O_4$ | $LiCoPO_4$ | $TiNb_2O_7$ | Liquid |
| Example 9 | $LiNi_{0.5}Mn_{1.5}O_4$ | $LiCoPO_4$ | $TiNb_2O_7$ | Liquid |
| Example 10 | $LiNi_{0.5}Mn_{1.5}O_4$ | $LiCo_{0.5}Fe_{0.5}SiO_4$ | $Li_4Ti_5O_{12}$ | Liquid |
| Example 11 | $LiNi_{0.5}Mn_{1.45}Cu_{0.05}O_4$ | $LiCoPO_4$ | $Li_4Ti_5O_{12}$ | Liquid |
| Example 12 | $LiNi_{0.5}Mn_{1.5}O_4$ | $LiCoPO_4$ | $Li_4Ti_5O_{12}$ | Liquid |

TABLE 2

| | Positive electrode active materials | | Negative | |
| --- | --- | --- | --- | --- |
| | Lithium nickel manganese oxide | Cobalt-containing oxide | electrode active material | State of non-aqueous electrolyte |
| Comparative Example 1 | $LiNi_{0.5}Mn_{1.5}O_4$ | — | $Li_4Ti_5O_{12}$ | Liquid |
| Comparative Example 2 | $LiNi_{0.5}Mn_{1.5}O_4$ | $LiCoPO_4$ | $Li_4Ti_5O_{12}$ | Liquid |
| Comparative Example 3 | $LiNi_{0.5}Mn_{1.5}O_4$ | $LiCoPO_4$ | $Li_4Ti_5O_{12}$ | Liquid |
| Comparative Example 4 | $LiNi_{0.5}Mn_{1.5}O_4$ | $LiCoPO_4$ | $Li_4Ti_5O_{12}$ | Liquid |
| Comparative Example 5 | $LiNi_{0.5}Mn_{1.5}O_4$ | $LiCoPO_4$ | $Li_4Ti_5O_{12}$ | Liquid |

TABLE 2-continued

| | Positive electrode active materials | | Negative electrode active material | State of non-aqueous electrolyte |
|---|---|---|---|---|
| | Lithium nickel manganese oxide | Cobalt-containing oxide | | |
| Comparative Example 6 | LiNi$_{0.5}$Mn$_{1.5}$O$_4$ | — | TiNb$_2$O$_7$ | Liquid |

TABLE 3

| | Positive electrode active materials | | | Ratio of average particle size of positive electrode active materials (d50(Ni—Mn)/d50(Co)) | B/A | Maintenance rate at 25° C. after 500 cycles | Amount of gas |
|---|---|---|---|---|---|---|---|
| | Average particle size of lithium nickel manganese oxide (d50(Ni—Mn)) | Average particle size of cobalt-containing oxide (d50(Co)) | Crystallite diameter of cobalt-containing oxide (d) | | | | |
| Example 1 | 9.8 μm | 0.5 μm | 48 nm | 19.6 | 10 wt % | 90% | 2.0 cc |
| Example 2 | 9.8 μm | 0.1 μm | 48 nm | 98 | 10 wt % | 94% | 0.8 cc |
| Example 3 | 9.8 μm | 0.9 μm | 100 nm | 10.9 | 10 wt % | 82% | 3.5 cc |
| Example 4 | 9.8 μm | 0.06 μm | 20 nm | 163.3 | 10 wt % | 86% | 2.1 cc |
| Example 5 | 9.8 μm | 0.5 μm | 48 nm | 19.6 | 20 wt % | 93% | 1.2 cc |
| Example 6 | 9.8 μm | 0.5 μm | 48 nm | 19.6 | 40 wt % | 89% | 2.2 cc |
| Example 7 | 9.8 μm | 0.5 μm | 48 nm | 19.6 | 20 wt % | 88% | 1.5 cc |
| Example 8 | 18.0 μm | 1.8 μm | 48 nm | 10 | 5 wt % | 87% | 1.4 cc |
| Example 9 | 2.0 μm | 0.02 μm | 48 nm | 100 | 5 wt % | 93% | 1.8 cc |
| Example 10 | 15.0 μm | 0.06 μm | 20 nm | 250 | 5 wt % | 84% | 2.2 cc |
| Example 11 | 9.2 μm | 0.5 μm | 48 nm | 18.4 | 10 wt % | 95% | 1.5 cc |
| Example 12 | 2.0 μm | 0.5 μm | 48 nm | 4 | 5 wt % | 83% | 3.0 cc |

TABLE 4

| | Positive electrode active materials | | | Ratio of average particle size of positive electrode active materials (d50(Ni—Mn)/d50(Co)) | B/A | Maintenance rate at 25° C. after 500 cycles | Amount of gas |
|---|---|---|---|---|---|---|---|
| | Average particle size of lithium nickel manganese oxide (d50(Ni—Mn)) | Average particle size of cobalt-containing oxide (d50(Co)) | Crystallite diameter of cobalt-containing oxide (d) | | | | |
| Comparative Example 1 | 9.8 μm | — | — | — | 0 wt % | 76% | 8.6 cc |
| Comparative Example 2 | 9.8 μm | 4.2 μm | 220 nm | 2.3 | 50 wt % | 72% | 9.0 cc |
| Comparative Example 3 | 9.8 μm | 0.01 μm | 5 nm | 980 | 50 wt % | 74% | 7.8 cc |
| Comparative Example 4 | 9.8 μm | 0.01 μm | 5 nm | 980 | 60 wt % | 61% | 5.5 cc |
| Comparative Example 5 | 9.8 μm | 0.01 μm | 5 nm | 980 | 2 wt % | 74% | 8.2 cc |
| Comparative Example 6 | 18.0 μm | — | — | — | 0 wt % | 72% | 6.2 cc |

The results of Examples 1 to 12 and Comparative Examples 1 to 6 show that the following conditions offers excellence in gas prevention and in maintenance rate.

A positive electrode active material contains a lithium nickel manganese oxide and a cobalt-containing oxide.

A ratio by weight (B/A) of the cobalt-containing oxide to a total of weights of the cobalt-containing oxide and the lithium nickel manganese oxide is 5 wt % or more and 40 wt % or less.

Furthermore, a ratio by weight (B/A) of the cobalt-containing oxide to a total of weights of the cobalt-containing oxide and the lithium nickel manganese oxide being 10 wt % or more and 20 wt % or less offers more excellence in preventing gas and in maintenance rate.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrode comprising:
a current collector; and
an active material layer disposed on at least one the of the current collector,
wherein
the active material layer comprises active materials which include at least a first oxide and a second oxide,
the first oxide is a cobalt-containing oxide and the second oxide is a lithium nickel manganese oxide,
a ratio of a weight of the cobalt-containing oxide to a total of weights of the cobalt-containing oxide and the lithium nickel manganese oxide is 5 wt % or more and 40 wt % or less, and
the lithium nickel manganese oxide has a spinel structure,
wherein a ratio of an average particle size of the lithium nickel manganese oxide d50 Ni—Mn) to an average particle size of the cobalt-containing oxide d50(Co) is 10≤d50(Ni—Mn)/d50(Co)≤200.

2. The electrode according to claim 1, wherein
the cobalt-containing oxide has a crystallite diameter of 1 nm or more and 100 nm less, and
the crystallite diameter is calculated from a half width of a main peak observed by X-ray diffraction measurement.

3. The electrode according to claim 1, wherein
the ratio is 10 wt % or more and 20 wt % or less.

4. The electrode according to claim 1, wherein
the lithium nickel manganese oxide has an average particle size of 1 μm or more and 20 μm or less.

5. The electrode according to claim 1, wherein
the cobalt-containing oxide has an average particle size of 10 nm or more and 2 μm or less.

6. The electrode according to claim 1, wherein
the cobalt-containing oxide contains at least one of $LiM_xCo_{1-x}PO_4$, $Li_2M_xCo_{1-x}PO_4F$, $LiM_xCo_{1-x}O_2$, $LiM_xCo_{1-x}BO_3$, and $LiM_xCo_{1-x}SiO_4$ where 0≤x≤0.8, and M includes at least one selected from the group consisting Mn, Ni, Fe, Mg, Zn and Al.

7. A non-aqueous electrolyte battery comprising:
a positive electrode;
a negative electrode which includes a titanium-containing oxide; and
a non-aqueous electrolyte,
wherein the positive electrode is the electrode according to claim 1.

8. The non-aqueous electrolyte battery according claim 7, wherein
the titanium-containing oxide contains at least one of
a spinel lithium titanate $Li_{4+x}Ti_5O_{12}$ where −1≤x≤3,
a monoclinic β-type titanium composite oxide $Li_xTiO_2$, (where 0≤x),
a niobium titanium oxide $Ti_{1-x}M1_xNb_{2-y}M2_yO_{7-\delta}$ where 0≤x<1, 0≤y<1, M1 and M2 contain at least one selected from the group consisting of Mg, Fe, Ni, Co, W, Ta and Mo, and M1 and M2 may be the same or different, and
an orthorhombic Na-containing niobium titanium composite oxide $Li_{2+v}Na_{2-w}M1_xTi_{6-y-z}Nb_yM2_zO_{14+\delta}$ where M1 includes at least one selected from the group consisting of Cs, K, Sr, Ba and Ca, M2 includes at least one selected from the group consisting of Zr, Sn, V, Ta, Mo, W, Fe, Co, Mn and Al, 0≤v≤4, 0<w<2, 0≤x<2, 0<y≤6, 0≤z<3, −05≤δ≤0.5.

9. The non-aqueous electrolyte battery according to claim 7, wherein
the non-aqueous electrolyte is a liquid non-aqueous electrolyte.

10. A battery pack comprising:
the non-aqueous electrolyte battery according to claim 7.

11. The battery pack according to claim 10, further comprising:
a current-carrying external terminal; and
a protection circuit.

12. The battery pack according to claim 10, further comprising:
a plurality of non-aqueous electrolyte batteries which are the non-aqueous electrolyte battery respectively,
wherein the non-aqueous electrolyte batteries are electrically connected in series or in parallel, or in series and parallel.

13. A vehicle comprising the battery pack according to claim 10.

14. The vehicle according to claim 13, wherein
the battery pack recovers a regenerative energy from a power of the vehicle.

* * * * *